Aug. 18, 1925.
L. W. THOMPSON
1,550,124
FLOW METER
Filed Sept. 5, 1924
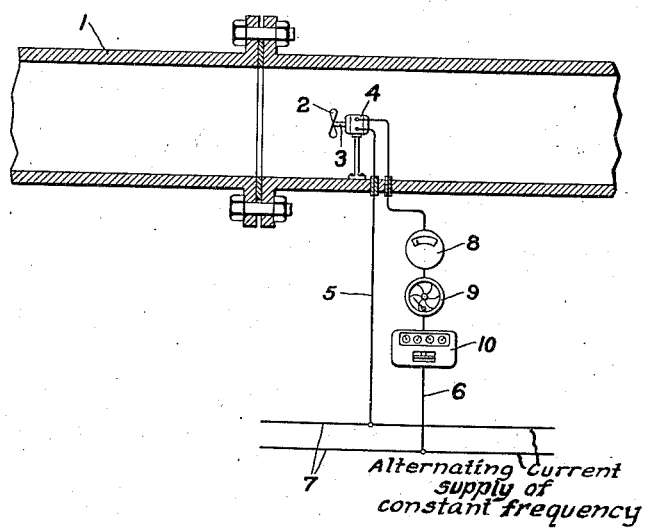
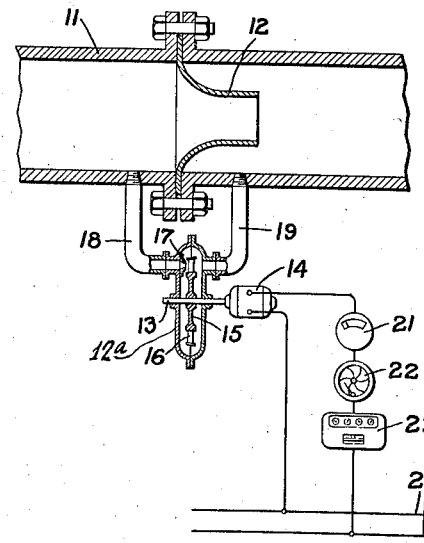
Inventor:
Louis W. Thompson,
by
His Attorney.

Patented Aug. 18, 1925.

1,550,124

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

FLOW METER.

Application filed September 5, 1924. Serial No. 736,171.

*To all whom it may concern:*

Be it known that I, LOUIS W. THOMPSON, a citizen of the United States, residing at Schenectady, in the county of Schenectady, State of New York, have invented certain new and useful Improvements in Flow Meters, of which the following is a specification.

The present invention relates to flow meters such as are used for measuring the flow of fluid through conduits and has for its object to provide an improved instrument of this character.

For a consideration of what I believe to be novel and my invention, attention is directed to the accompanying description and the claims appended thereto.

In the drawing, Fig. 1 is a diagrammatic view of a flow meter embodying my invention, and Fig. 2 is a similar view of a modification.

Referring to the drawing, 1 indicates a conduit through which the fluid to be metered flows. In conduit 1 is arranged a rotor member 2 which is acted upon by the flowing fluid so as to be turned thereby. Rotor member 2 of any suitable construction is connected to the shaft 3 of an alternating current motor 4 of the synchronous or induction type. Rotor member 2 may be connected directly to shaft 3 or it may be connected thereto through suitable intermediary instrumentalities, and motor 4 may be arranged either inside or outside the conduit, the essential thing being that rotor member 2, when acted upon by the flowing fluid, tends to drive the motor. Motor 4 is connected by conductors 5 and 6 to an alternating current supply line 7 of constant frequency such line being connected with a suitable alternating current generator (not shown). In the motor circuit formed by conductors 5 and 6 are suitable electrical measuring instruments such as for example, an indicating ammeter 8, a curve drawing ammeter 9 and an integrating watthour meter 10.

With the above described arrangement, the speed of the motor is fixed by the frequency on line 7 and the action of the fluid on rotor member 2 tending to drive the same serves to cause the motor to return current to line 7, the amount returned to the line being proportional to the torque which the fluid exerts on the rotor member. Since the torque is proportional to the rate of flow of fluid through the conduit, it follows, therefore, that the flow of current in the motor circuit is proportional to the flow of fluid through the conduit. The electrical measuring instruments measure the flow of current in the circuit and they may be calibrated to read directly in terms of flow of fluid in conduit 1.

In Fig. 2 is shown a modification wherein the member which generates the torque proportional to the rate of flow and the synchronous motor are both arranged outside the conduit through which the fluid to be metered flows such member being in the form of a vane wheel or turbine wheel which is actuated by a flow of fluid proportional to the flow through the main conduit. According to this embodiment of my invention, I provide in conduit 11 pressure difference creating device 12 which creates a pressure difference or drop in pressure proportional to the rate of flow of fluid in the conduit. This device may be of any suitable type, a flow tube such as that disclosed in the patent to Dodge, No. 1,298,471, patented March 25, 1919, being illustrated in the present instance. Adjacent conduit 11 is a casing 12ª in which is journaled a shaft 13 connected to the shaft of a synchronous motor 14. Mounted on shaft 13 in casing 12ª is a vane wheel or turbine wheel 15. Adjacent to the vanes or blades 16 on the wheel is a nozzle 17 for directing actuating fluid against them. Nozzle 17 is connected by a pipe 18 to the high pressure or leading pressure side of the pressure difference creating device 12. Casing 12ª on the discharge side of the vanes or blades 16 is connected by a pipe 19 to the low pressure or trailing pressure side of the pressure difference creating device.

With this arrangement there will be a drop in pressure through casing 12ª proportional to the rate of flow of fluid through conduit 11 and this will effect a flow of fluid through pipe 18 proportional to such flow. The fluid flowing through pipe 18 will be discharged by nozzle 17 against the vanes or blades on wheel 15 exerting a driving torque thereon, and after passing through the vanes or blades will flow through pipe 19 back to conduit 11. The flow of fluid through pipe 18 and the torque exerted on the wheel by such fluid when discharged from nozzle 17 will vary in accordance with the drop in pressure across nozzle 12 and hence there will be exerted on the wheel a driving force proportional to the rate of flow through conduit 11. The synchronous motor 14 is, as in Fig. 1, connected to a source of constant frequency indicated at 20, the circuit containing suitable measuring instruments such as an indicating ammeter 21, a curve drawing ammeter 22 and an integrating watthour meter 23, and these instruments measure the flow of fluid through conduit 11 as already explained in connection with Fig. 1.

In accordance with the provisions of the patent statutes, I have described the principle of operation of my invention, together with apparatus which I now consider to represent the best embodiment thereof, but I desire to have it understood that the apparatus shown is only illustrative and that the invention may be carried out by other means.

What I claim as new and desire to secure by Letters Patent of the United States is:—

1. In a flow meter, a member which generates a torque proportional to the rate of fluid flow, a synchronous or induction motor to which said member is connected, a source of alternating current of fixed frequency, an electric circuit connecting the motor to said source, and an electrical measuring instrument in said circuit.

2. In a flow meter, the combination with a conduit through which a fluid to be metered flows, of a bladed member associated with said conduit upon which flowing fluid acts, a synchronous or induction motor to which the bladed member is connected, a source of alternating current of fixed frequency, an electric circuit connecting the motor to said source, and an electrical measuring instrument in said circuit.

3. In a flow meter, the combination of a conduit through which a fluid to be metered flows, a member in the conduit for creating a pressure difference proportional to the rate of flow of fluid through the conduit, means for utilizing such pressure difference to produce a torque proportional to such pressure difference, a synchronous or induction motor, means for applying the torque produced by said first-named means to said synchronous or induction motor, a source of alternating current of fixed frequency, an electric circuit connecting the motor to said source, and an electrical measuring instrument in said circuit.

In witness whereof, I have hereunto set my hand this 4th day of September, 1924.

LOUIS W. THOMPSON.